United States Patent
Wainscott

(10) Patent No.: US 9,493,104 B2
(45) Date of Patent: Nov. 15, 2016

(54) FEEDER TRAILER

(71) Applicant: Robert Wayne Wainscott, Olney, TX (US)

(72) Inventor: Robert Wayne Wainscott, Olney, TX (US)

(*) Notice: Subject to any disclaimer, the term of this patent is extended or adjusted under 35 U.S.C. 154(b) by 249 days.

(21) Appl. No.: 14/260,882

(22) Filed: Apr. 24, 2014

(65) Prior Publication Data

US 2015/0305299 A1 Oct. 29, 2015

(51) Int. Cl.
*A01K 5/02* (2006.01)
*A01K 1/00* (2006.01)
*B60P 3/04* (2006.01)
*A01K 1/02* (2006.01)

(52) U.S. Cl.
CPC ............ *B60P 3/04* (2013.01); *A01K 1/0035* (2013.01); *A01K 1/0281* (2013.01); *A01K 5/0225* (2013.01)

(58) Field of Classification Search
CPC .... A01K 5/02; A01K 5/0208; A01K 5/0225; A01K 5/0107; A01K 1/0035; A01K 1/0236; A01K 1/0281; B61D 3/163; B60P 3/04; B01D 2221/00; B01D 2221/06; B01D 2221/08
See application file for complete search history.

(56) References Cited

U.S. PATENT DOCUMENTS

| | | | | |
|---|---|---|---|---|
| 96,362 A | * | 11/1869 | Street | A01K 1/0236 119/408 |
| 124,387 A | * | 3/1872 | Remer | A01K 1/0236 119/408 |
| 4,060,111 A | * | 11/1977 | Burks | B65G 47/1471 141/231 |
| 4,092,044 A | * | 5/1978 | Hoffman | B60P 3/04 105/243 |
| 4,498,418 A | | 2/1985 | Chumley | |
| 4,527,935 A | | 7/1985 | Fortenberry | |
| 5,653,567 A | * | 8/1997 | Taylor | B60P 1/36 222/505 |
| 5,676,513 A | | 10/1997 | Bingham | |
| 6,263,833 B1 | * | 7/2001 | Runyan | A01K 5/001 119/51.11 |
| 6,889,630 B1 | | 5/2005 | Wayman | |
| 2002/0122713 A1 | * | 9/2002 | Muller | A01K 5/00 414/528 |
| 2009/0162169 A1 | * | 6/2009 | Kenna | A01D 90/10 414/25 |
| 2011/0293393 A1 | * | 12/2011 | Nuxoll | A01D 85/005 414/462 |
| 2013/0186343 A1 | * | 7/2013 | Gordon | A01K 5/002 119/57.1 |

OTHER PUBLICATIONS

T&S Feeders web site web page "T & S Trip Hopper Range Cattle Feeders" at www.tsfeeders.com, printed on Jul. 23, 2013.

* cited by examiner

*Primary Examiner* — Kathleen Alker
(74) *Attorney, Agent, or Firm* — Meyertons, Hood, Kivlin, Kowert & Goetzel, P.C.; Eric B. Meyertons

(57) ABSTRACT

In some embodiments, a trailer feeder system may include a trailer. The trailer may transport animals during use. The trailer may include a first container which contains, during use, animal feed. The first container may include a dispensing mechanism for dispensing feed in the first container to a surface adjacent the trailer. The trailer may include a transport ramp. The transport ramp may connect the first container to an opening in a cover. The transport ramp may include a plurality of openings. The trailer may include a second container which functions to contain animal feed. In some embodiments, the plurality of openings may be sized to allow feed of a predetermined size and smaller to be conveyed from the opening to the second container. In some embodiments, the trailer may include a transport mechanism which functions to elevate a bale of hay off of a surface.

10 Claims, 9 Drawing Sheets

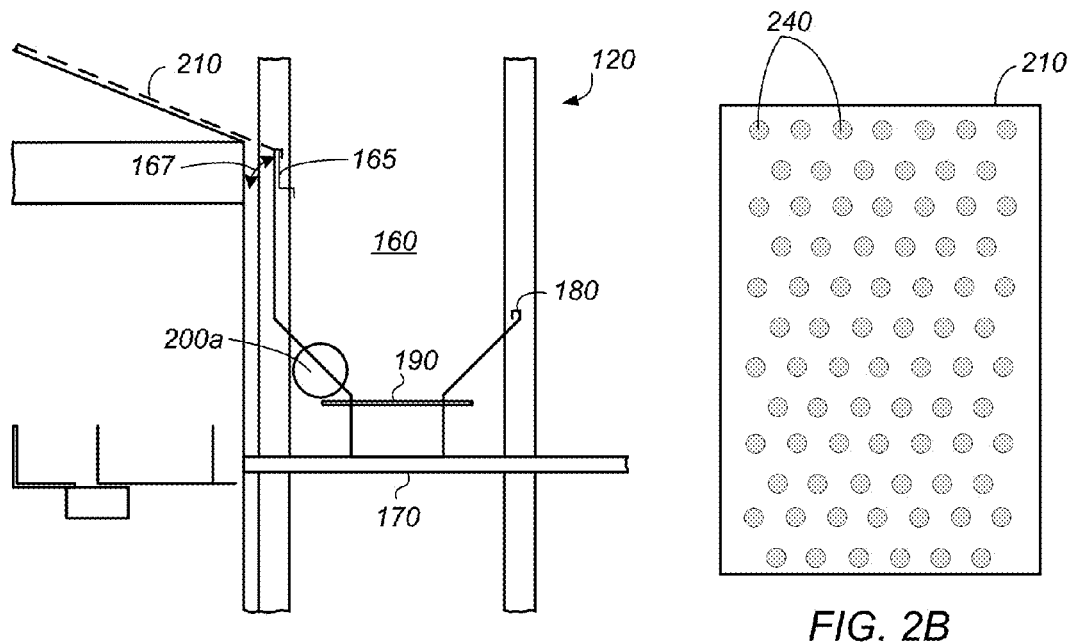
FIG. 2A
FIG. 2B
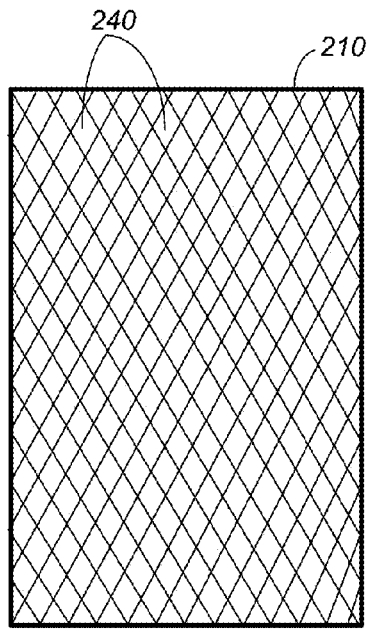
FIG. 2C
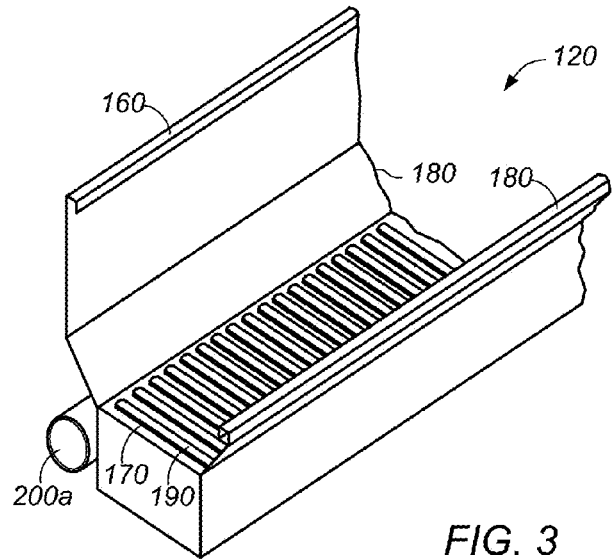
FIG. 3

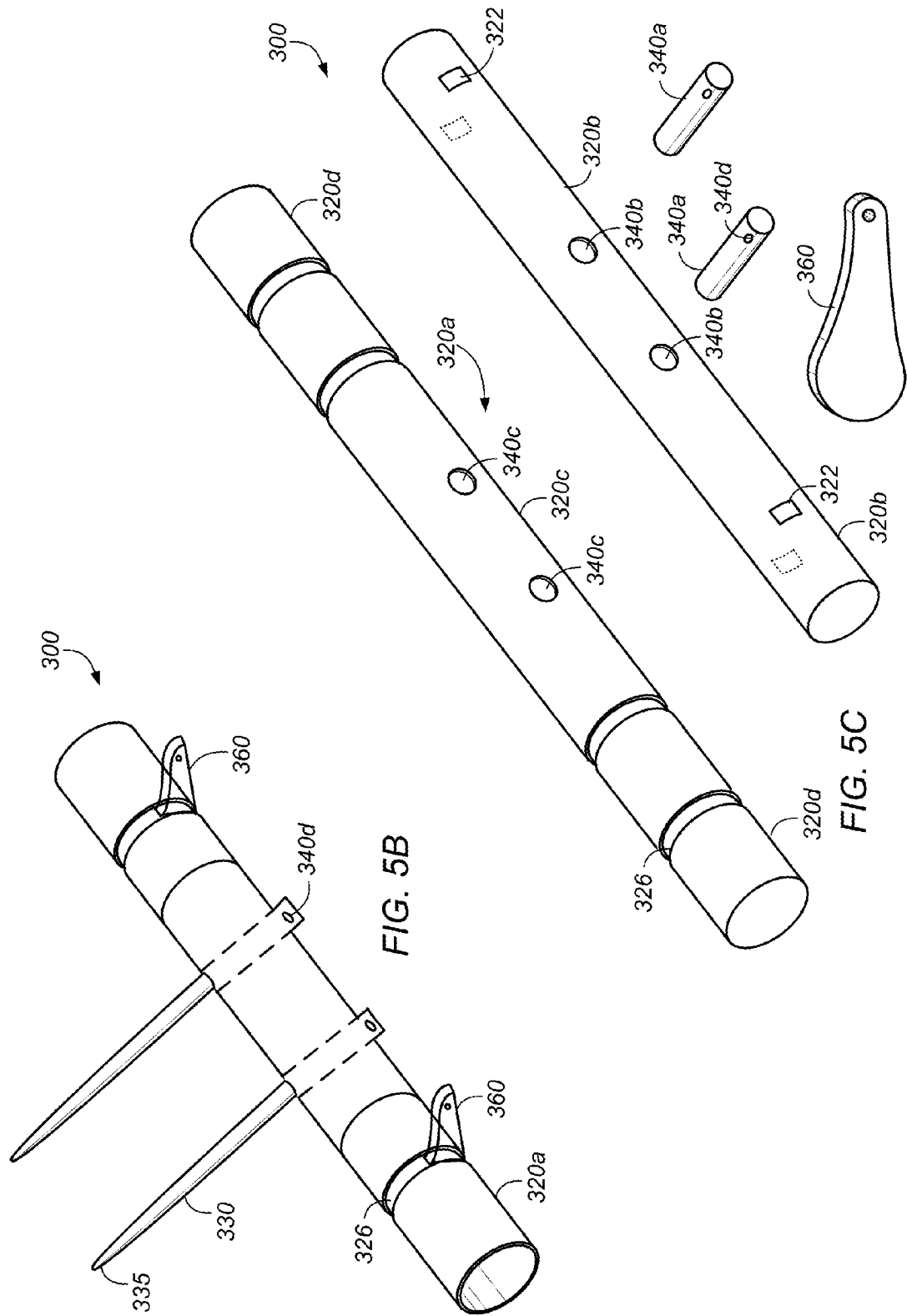

FEEDER TRAILER

BACKGROUND OF THE INVENTION

1. Field of the Invention

The present disclosure generally relates to transporting feed and livestock. More particularly, the disclosure generally relates to systems and methods for producing and using livestock transport trailers including mechanisms for sifting and dispensing feed.

2. Description of the Relevant Art

Transporting feed to livestock is a difficult and labor intensive job. Traditionally small operators have used manual labor (usually their own) to disperse feed to livestock from bags of feed transported on the operator's vehicle. More recently automated feeders have been used which disperse loose feed from vehicle or trailer mounted storage compartments. Feed is loaded into these storage compartments at a central distribution center such as a feed store. Typically cubed cake is used in the automated feeders, but problems persist with the waste (i.e., fines) associated with feeding cubed feed loosely on the ground. The feed is brittle and broken pieces left on the ground are typically ignored by livestock and left to waste and decompose unused. In addition automated feeders on trailers are typically only automated feeders on wheels and the trailer is not used for anything else. Therefore a system and/or method which reduces waste associated with feeding livestock on the open range and allows for additional uses of a trailer.

SUMMARY

In some embodiments, a trailer feeder system may include a trailer. The trailer may transport animals during use. The trailer may couple to a vehicle during use. A first end of the trailer may include a coupling mechanism configured to couple the trailer to a vehicle. The trailer may include a first container which contains, during use, animal feed. The first container may include a dispensing mechanism for dispensing feed in the first container to a surface adjacent the trailer. The trailer may include a transport ramp. The transport ramp may connect the first container to an opening in a cover. The cover may cover at least a portion of the trailer. The transport ramp may include a plurality of openings. The trailer may include a second container which functions to contain animal feed. In some embodiments, the plurality of openings are sized to allow feed of a predetermined size and larger to be conveyed from the opening to the first container. The plurality of openings may be sized to allow feed of a predetermined size and smaller to be conveyed from the opening to the second container.

In some embodiments, the system may include a first remote trigger mechanism. The first remote trigger mechanism may activate the dispensing mechanism of the first container.

In some embodiments, the system may include a positionable cover to inhibit entry in the opening leading to the fines container. The transport ramp may convey feed from the opening to the first container via gravity. The transport ramp may convey feed from the opening to the first container via a conveyor belt.

The second container may decouple from the trailer such that transportation of any feed contained within is facilitated.

In some embodiments, the trailer may include a transport mechanism which functions to elevate a bale of hay off of a surface. The transport mechanism may be positioned at a second end of the trailer opposite of a first end. The transport mechanism may include at least one elongated member couplable to a transport mechanism. At least one of the elongated members may function to penetrate a bale of hay. In some embodiments, the transport mechanism may include at least two elongated members which function to penetrate, for example, a bale of hay. In some embodiments, the system may include a second remote trigger mechanism which activates the transport mechanism such that a bale of hay is elevated off or lowered onto the surface.

BRIEF DESCRIPTION OF THE DRAWINGS

Advantages of the present invention may become apparent to those skilled in the art with the benefit of the following detailed description of the preferred embodiments and upon reference to the accompanying drawings.

FIGS. 2A-D depict a diagram of a crosscut view of an embodiment of a first end of a trailer depicting portions of a loose feed dispensing system.

FIG. 3 depicts a diagram of a perspective view of an embodiment of a first container forming a portion of a loose feed dispensing system.

FIG. 5B depicts a diagram of a perspective view of an embodiment of a portion of a hay bale transport system.

FIG. 5C depicts a diagram of an exploded view of an embodiment of a portion of a hay bale transport system.

Figure 1:
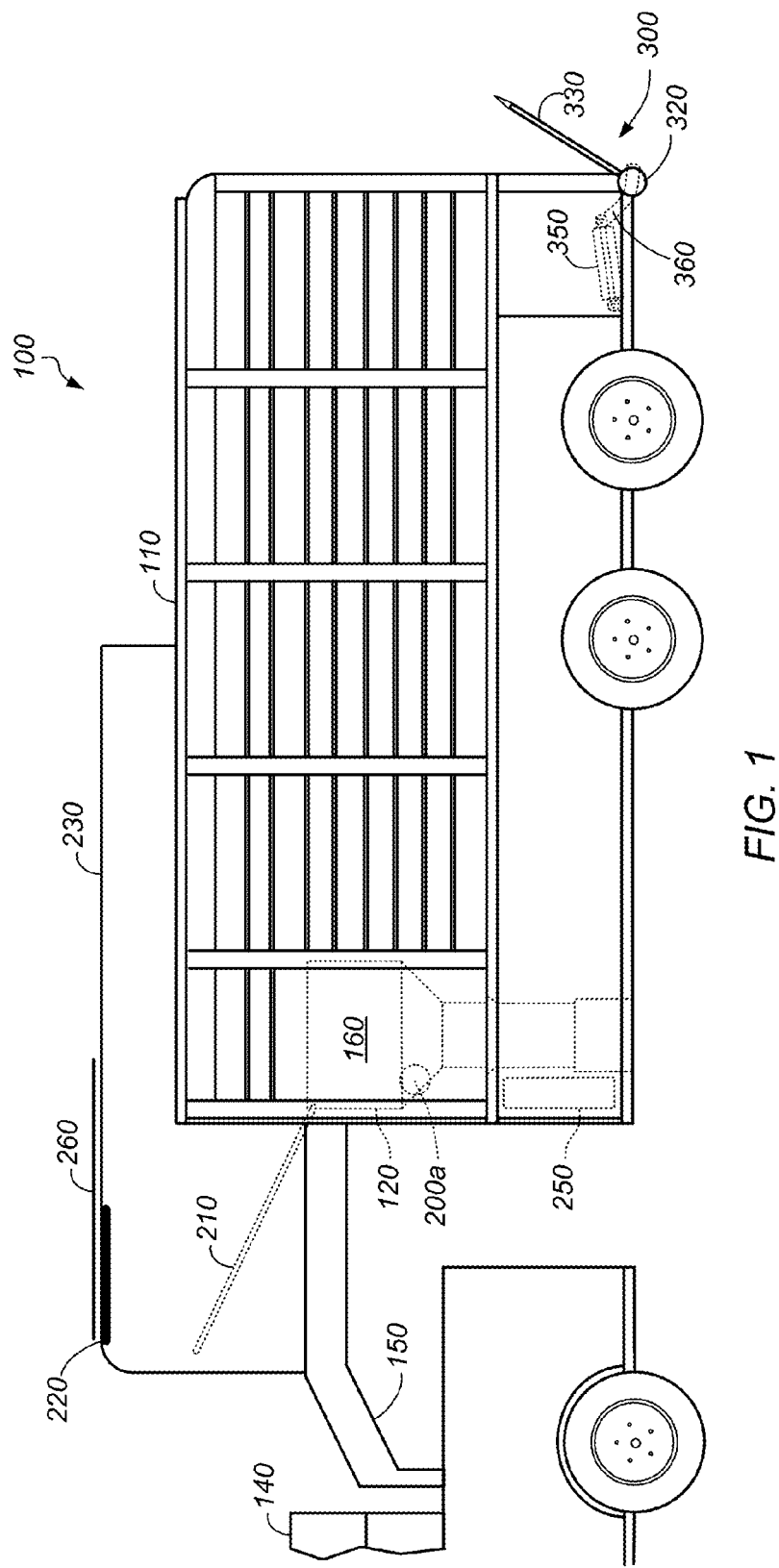
FIG. 1 depicts a diagram of an embodiment of a trailer including a loose feed dispensing system and a hay bale transport system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process affects another process or structure without the involvement of an intermediate step or component.

The term "bale of hay" or "hay bale" as used herein generally refers to any bound or unbound portion of dried vegetation purposed for feeding animals (e.g., livestock).

In some embodiments, a trailer feeder system may include a trailer. FIG. 1 depicts a diagram of an embodiment of a trailer feeder system 100 including a trailer 110, a loose feed dispensing system 120 and a hay bale transport system. The trailer may transport animals during use. The trailer may be configured to transport any number of different types of animals. Typically trailers may function to transport livestock such as, for example, cattle, horses, goats, sheep, exotics, etc. The trailer may be used to transport equipment (e.g., calf cradles, saddles, feed dispensers, etc.) and/or vehicles (e.g., all-terrain vehicles, motorcycles, etc.).

In some embodiments, the trailer may couple to a vehicle 140 during use. The trailer may couple to any number of vehicles capable of towing the weight of the trailer and any livestock and/or feed transported on the trailer (e.g., pickup trucks, semis). A first end of the trailer may include a coupling mechanism 150 configured to couple the trailer to a vehicle. A coupling mechanism may include a complementary portion which couples to a tow hitch (or tow bar). A tow hitch may include a device attached to the chassis of a vehicle for towing. A trailer may include gooseneck (e.g., as depicted in FIG. 1) or standard straight hitches. It can take the form of a tow ball to allow swiveling and articulation of a trailer, or a tow pin and jaw with a trailer loop, often used for large or agricultural vehicles where slack in the pivot pin allows similar movements. Another category is the towing pintle used on military vehicles worldwide.

The trailer may include a first container 160 which contains, during use, animal feed. Feed may include any type of feed appropriate for livestock. In some embodiments, feed used in the currently described system includes loose cubed feed. Cubed feed may include feed with a length of about 1 inch to about 5 inches, about 2 inches to about 4 inches, or about 3 inches. The cubed feed may have a diameter/width of about ⅝ inches to about ¾ inches. Such cubed feed is typically prepared for and distributed to cattle.

The first container may be appropriately sized for the trailer the first container is installed. Typically the first container may be sized to contain at least several hundred pounds of feed. Available feeders which are currently available and sized appropriately to be combined with a trailer may include a holding capacity of from about 300 lbs. to about 2000 lbs or more.

FIGS. 2A-B depict a diagram of a crosscut view of an embodiment of a first end of a trailer 110 depicting portions of a loose feed dispensing system 120. FIG. 3 depicts a diagram of a perspective view of an embodiment of a first container 160 forming a portion of a loose feed dispensing system 120 (without an endplate attached for easier viewing). The first container may include a dispensing mechanism 170 for dispensing feed in the first container to a surface adjacent the trailer (e.g., the feed may be dispensed below or adjacent the trailer). The dispensing mechanism may provide accurate metering of feed. The dispensing mechanism may periodically drop feed in piles of predetermined size and spacing. The dispensing mechanism may easily adjust as to the dispensing output. The first container may include one or more walls 180 which are angled to direct feed positioned in the first container towards, in some embodiments, a bottom of the first container and a conveyor mechanism 190. The conveyor may traverse along at least a portion of the bottom of the first container. The conveyor may be driven by one or more drive mechanisms (e.g., roller drums, etc.). The drive mechanisms may be actuated by a motor 200A. The conveyor may include a plurality of extensions coupled to the surface of the conveyor which function to push feed as the conveyor moves along the bottom of the first container. The conveyor may move feed towards a shaft with a gating mechanism which normally keeps the gate closed such that feed is not conveyed out of the first container before desired. For further discussions regarding dispensing mechanism for accurately dispensing metered amounts of feed see U.S. Pat. No. 5,653,567 to Taylor issued Aug. 5, 1997, which is incorporated by reference herein.

Figure 2D:
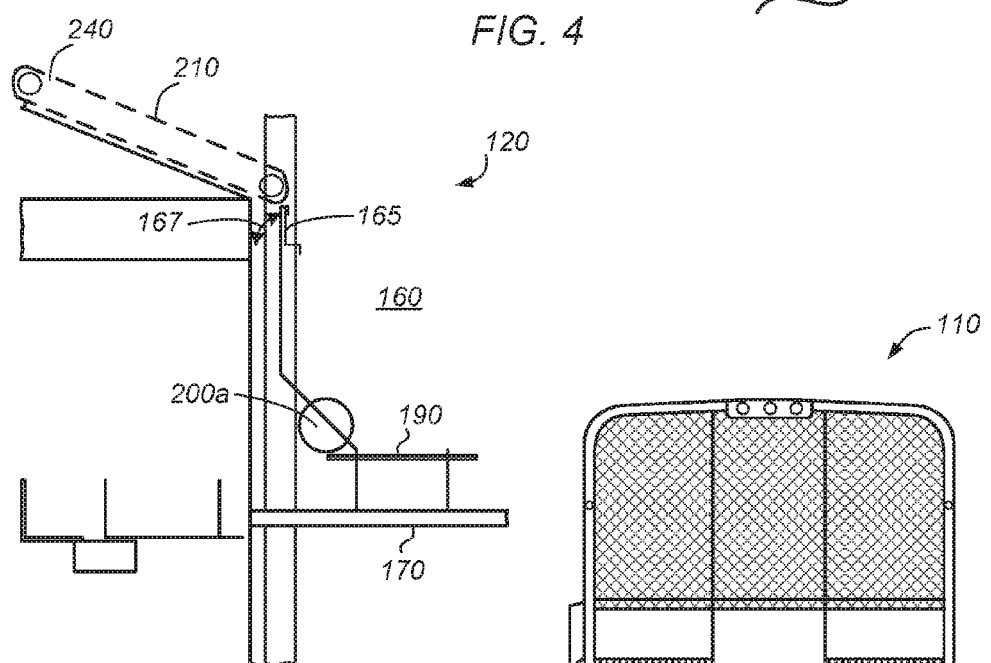

The trailer may include a transport ramp 210 (e.g., as depicted in FIGS. 1-2A-B). The transport ramp may connect the first container to an opening 220 in a cover 230. The cover may cover at least a portion of the trailer. The cover may function to protect, to at least a limited extent, the automated feeding system from the elements. The cover may be a portion of a larger cover which covers at least a majority of the trailer such that any livestock transported by the trailer is protected, to at least a limited extent, from the elements as well. In some embodiments, the transport ramp 210 may be angled. The transport ramp may convey feed from the opening to the first container via gravity. The transport ramp may be formed from a material with a smooth surface and/or use other means to reduce friction on the surface such that feed travels more easily along the transport ramp. In some embodiments, the transport ramp conveys feed from the opening to the first container via a moving conveyor belt 210 with openings 240 (e.g. as depicted in FIG. 2D). In some embodiments, a diverter 165 may function to allow a user to divert fines between a second container 250 and the first container 160. Arrow 167 depicts the movement of the diverter 165 during use. In some embodiments, the diverter may be manually operated (e.g., using an external lever coupled to the diverter). When the diverter is in at least substantially vertical position (e.g., as depicted in FIG. 2A) the smaller feed particles (i.e., fines) are separated from the larger pieces of feed. If the operator wishes not to separate fines and/or if dispensing feed with a size which is on average smaller than the openings in the currently used transport ramp (e.g., whole grain (e.g., corn, oats, etc.) the diverter may be moved to a substantially horizontal position (e.g., the external lever may be toward the front of the trailer at about a 45° angle causing all material no matter the size to go to the feed dispenser 120 (e.g., as depicted in FIG. 3).

The transport ramp 210 may include a plurality of openings 240 (e.g., as depicted in FIG. 2B). The trailer may include a second container 250 which functions to contain animal feed. In some embodiments, the plurality of openings are sized to allow feed of a predetermined size and larger to be conveyed from the opening to the first container. The plurality of openings may be sized to allow feed of a predetermined size and smaller (i.e., fines) to be conveyed from the opening to the second container. The openings may be sized differently for different types of feed and/or to direct different sized portions to the first and/or second containers.

In some embodiments, the size of the openings may be about 0.25 inches to about 1.0 inch, about 0.3 inches to about 0.75 inches, or about 0.5 inches. In some embodiments, the size of the openings may be about 75% of the smallest dimension of unbroken piece of feed, about 50% of the smallest dimension of unbroken piece of feed, or about 25% of the smallest dimension of unbroken piece of feed.

The openings may have any shape necessary and may be dependent upon the shape of the feed. The openings depicted in FIG. 2B are circular but this should not be seen as limiting. The openings may be circular, diamond, oval, rectangular, square, etc. In some embodiments, transport ramp may be formed from expanded metal sheets (e.g., with substantially diamond or parallelogram shaped openings, e.g., as depicted in FIG. 2C).

The openings may allow feed which is smaller than the openings to fall through the openings and ultimately conveyed to the second container. Feed which is smaller than the openings may typically include feed which has been broken such that the feed is smaller than the average size of the factory produced feed specifications. This allows the smaller pieces of feed to be collected in the second container. This smaller feed is typically wasted if dispensed on the ground for livestock to eat. The smaller pieces are more difficult for livestock to pick up off the ground and end up being left behind and ground into the surface and/or eventually decompose. This is one of the advantages of the currently described system and/or method in that these smaller portions of feed are not wasted and may be collected in the second container. The feed collected in the container may be used at a later time, for example, may be placed in a feeding container (e.g., a trough) where livestock may eat the feed without wasting very much because the smaller pieces do not mix in with any dirt or gravel. The second container may decouple from the trailer such that transportation of any feed contained within is facilitated. The second container may couple to the system using snaps, hooks, zippers, hook and loop, etc.

In some embodiments, the size (e.g., diameter, width, etc.) of at least some of the openings may be adjustable. Openings wherein the size may be adjustable allow for adapting the system for feed with different average sizes. For example, the size of the openings may be decreased in such instances when a user wants to switch to distributing a smaller feed size. The size of the openings may be adjusted using a number of different methods and/or systems.

In some embodiments, a size of the openings may be adjusted by replacing a first transport ramp with a second transport ramp with smaller openings. In some embodiments, a size of the openings may be adjusted by positioning a second transport ramp on top of a first transport ramp with smaller openings. In some embodiments, a size of the openings may be adjusted by literally adjusting a size of the openings. A mechanism may allow for the size of the opening to be increased and/or decreased. For example, a switch may be activated which slides a first sheet relative to a second sheet. The first sheet and the second sheet may be have openings and by aligning or misaligning these openings on the two sheets may allow for the size of the openings to be adjusted.

In some embodiments, the system may include a first remote trigger mechanism. The first remote trigger mechanism may activate the dispensing mechanism of the first container. In some embodiments, the remote trigger system may be positioned in a towing vehicle (e.g., in the cab). In some embodiments, the remote trigger system may be positioned on an exterior of the trailer. In some embodiments, the remote trigger system may include a mechanical device. A mechanical remote trigger system may include, for example, a tension wire cable system. In some embodiments, the remote trigger system may include an electronic device. The electronic device may be wired to the dispensing mechanism such that the two are electrically coupled. The electronic device may be wirelessly coupled to the dispensing mechanism such that the two are electrically coupled. A wirelessly coupled remote trigger mechanism would have advantages including, for example, ease of installation in a towing vehicle and subsequent transfer to a second towing vehicle.

In some embodiments, the system may include a positionable cover 260 (e.g., as depicted in FIG. 1) to inhibit entry in the opening leading to the conveyor. The positionable cover may include a hinged hatch that, for example, either slides over the opening or swings into position. The positionable cover may include a locking mechanism. The locking mechanism may inhibit movement of the positionable cover upon activation of the locking mechanism. The locking mechanism may inhibit movement of the positionable cover in the open and/or closed position. In some embodiments, the positionable cover may be actuated by an electric motor or hydraulic system.

Figure 4:
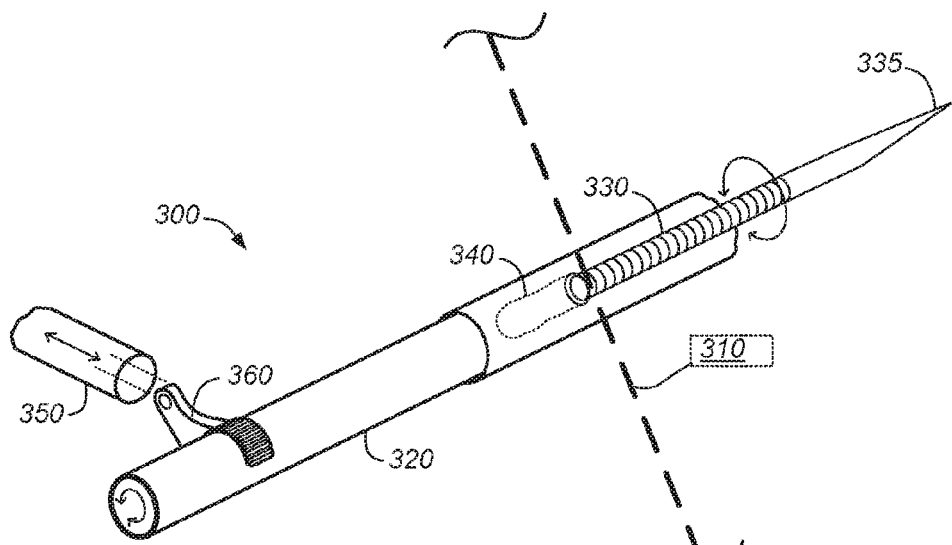
FIG. 4 depicts a diagram of a perspective view of an embodiment of a portion of a hay bale transport system.
Figure 5A:
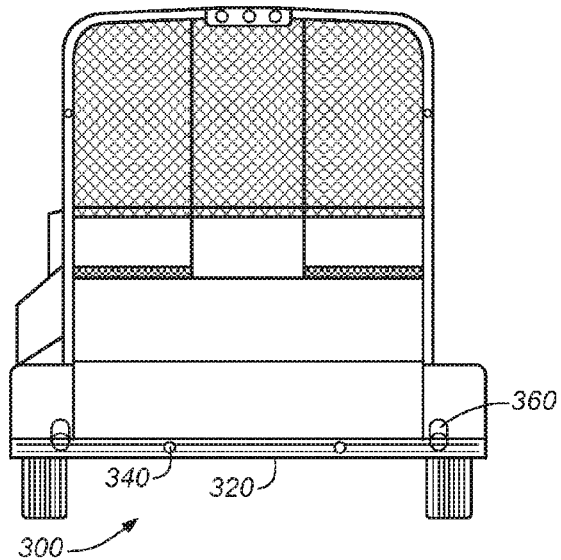
FIG. 5A depicts a diagram of a rear view of an embodiment of a trailer and a hay bale transport system.

In some embodiments, the trailer 110 may include a transport mechanism 300 which functions to elevate a bale of hay 310 off of a surface. FIG. 4 depicts a diagram of a perspective view of an embodiment of a portion of a hay bale transport system 300 (FIG. 4 depicts about half of a hay bale transport system 300, in many embodiments the system 300 may include two elongated members 330 (e.g., hay spikes 330 including pointed ends 335). FIG. 5A depicts a diagram of a rear view of an embodiment of a trailer 110 and a hay bale transport system 300. Elevating a bale of hay off of a surface may allow the bale of hay to be more easily transported from a first location to a second location. This is advantageous due to the large and bulky nature of hay bales (e.g., large round hay bales). The transport mechanism may be positioned at a second end of the trailer opposite of a first end (e.g., wherein the trailer coupling mechanism is located). The transport mechanism may include a first elongated member 320 (when installed the first elongated member may resemble a vehicle/trailer bumper). The first elongated member may run along at least a portion of the width of the trailer (in some embodiments the first elongated member may be formed by multiple portions). The first elongated member may be positioned substantially within a bumper of the trailer. The transport mechanism may include at least one second elongated member 330 (two members 330 may be more desirable in some embodiments) couplable to the transport mechanism. The second elongated member may be couplable to the first elongated member (e.g., in opening 340). In some embodiments, the transport mechanism may include two second elongated members. The elongated members may function to penetrate a bale of hay and assist in the hays transport. In some embodiments, the second elongated members are removable when not in use such that, for example, livestock may be loaded/unloaded from the trailer. The second elongated members may be stored on the trailer when they are not in use.

The second elongated member may be couplable to the first elongated member in a number of different fashions. In some embodiments, the second elongated member may be couplable to the first elongated member via a threaded coupling. The second elongated member may be couplable to the first elongated member by inserting the second elongated member 330 into an opening 340 of the first elongated member and held in the opening using one or more pins and pin openings (e.g., as depicted in FIG. 5B-C). In some embodiments, first elongated member 320 may include an outer elongated member 320a (e.g., 4.5" pipe) and an inner elongated member 320b (e.g., 4.0" pipe). Outer elongated member 320a may be separated into two sections 320d and one section 320c. Torque arms or cams 360 may be coupled (e.g., spot welded) to inner elongated member 320b such that the arms of the cams extend out of member 320b (e.g., out of opening 322 and out of slots 326 of the assembled unit depicted in FIG. 5B). Opening 340a (e.g., small diameter pipe slightly larger than base of second elongated members, the pipe may be inserted through openings 340b and 340c) may be coupled to both elongated members 320b and 320c. The second elongated members 330 may be positionable in openings 340a. The second elongated members may be inhibited from removal from openings 340a by positioning, for example, a pin through openings 340d and through an opening in the second elongated members such that the second elongated members are coupled to the openings 340a. Sections 320d may be coupled (e.g., directly attached by spot welding) to a rear of a trailer (e.g., to the fenders and/or floor of the trailer). Sections 320d may remain stationary relative to the trailer while section 320c may rotate with the inner member 320b when the system is activated to raise/lower the elongated members 330 (e.g., hay spikes).

In some embodiments, the transport mechanism may include a lifting mechanism 350. The lifting mechanism may function to move the second elongated members from a first lowered position to a second elevated position. In some embodiments, the lifting mechanism may rotate the first elongated member between the first and second position such that the second elongated member(s) are rotated between the first and second position. In some embodiments, the lifting mechanism may include a hydraulic cylinder (e.g., as depicted in FIGS. 1 and 4) 350. The hydraulic cylinder may be coupled to a cam 360 which is in turn coupled to the first elongated member. The hydraulic cylinder may move the cam which in turn rotates the first elongated member from a first position to an elevated position (e.g., as depicted in FIG. 1).

In some embodiments, the system may include a second remote trigger mechanism which activates the transport mechanism such that a bale of hay is elevated off or lowered onto the surface. The second remote trigger mechanism may include any of the embodiments described herein as described regarding the first trigger mechanism.

Figure 6:
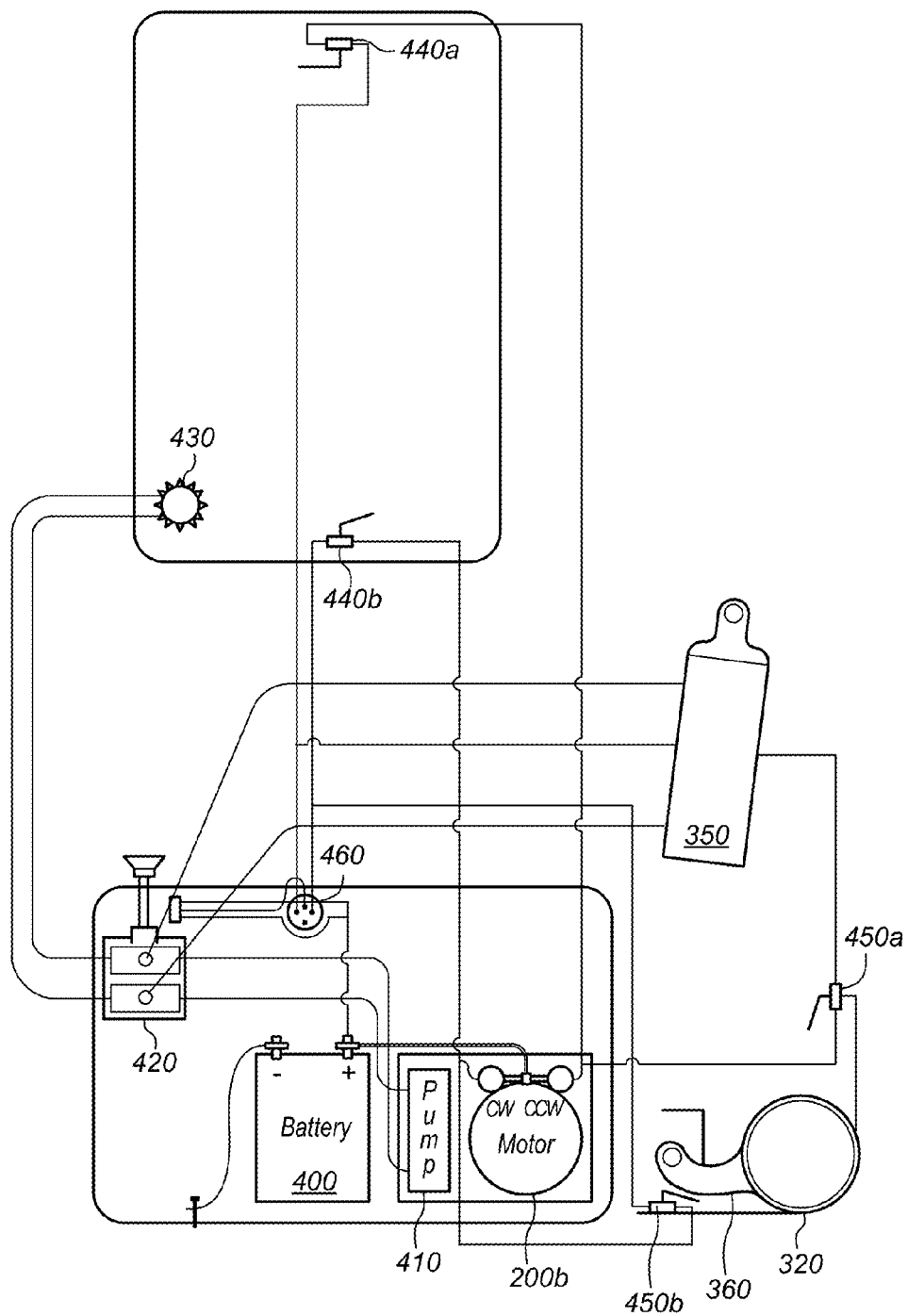
FIG. 6 depicts an electrical diagram of the remote trigger system coupled to a loose feed dispensing system and a hay bale transport system.

FIG. 6 depicts an electrical/system diagram of the remote trigger system coupled to a loose feed dispensing system and a hay bale transport system. Motor 200B is coupled to battery 400 and pump 410. Pump 410 is coupled to switch 420. Switch 420 directs hydraulic fluids to hydraulic cylinder 350 or to work a hydraulic motor 430 which may open/close the positionable cover 260. The switches 440a-b may assess if the positionable cover is closed or open respectively. The switches 450a-b may assess if the second elongated members are down or up respectively. Electrical switch 460 may electrically couple switches 440 and 450 to one or more remote trigger mechanisms which operate the loose feed dispensing system and the hay bale transport system.

Figure 7:
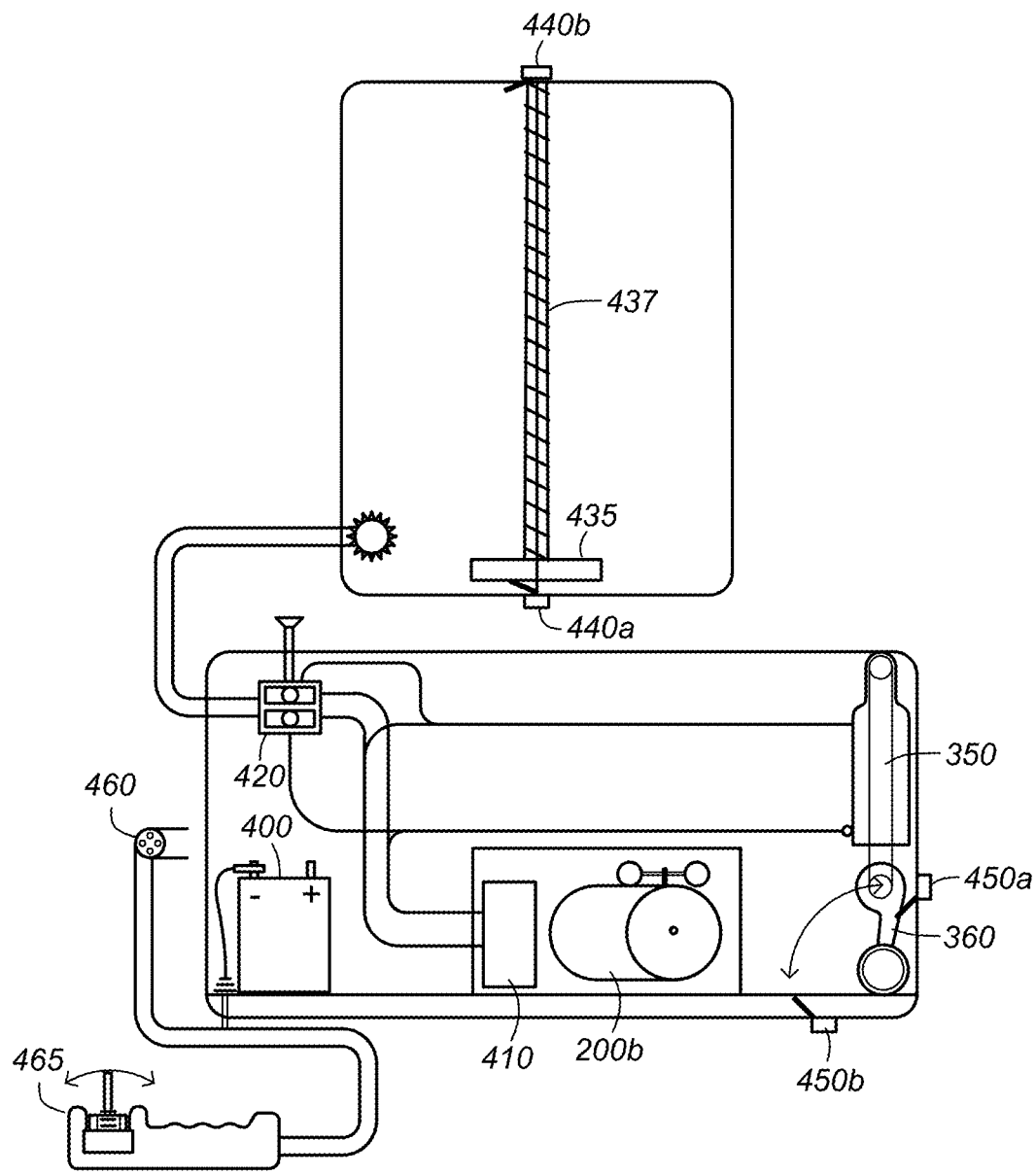
FIG. 7 depicts an electrical diagram of the remote trigger system coupled to a loose feed dispensing system and a hay bale transport system.

FIG. 7 depicts an electrical diagram of the remote trigger system coupled to a loose feed dispensing system and a hay bale transport system. Motor 200B is coupled to battery 400 and pump 410. Pump 410 is coupled to switch 420. Switch 420 directs hydraulic fluids to hydraulic cylinder 350.

Switch 420 may work in combination with servo motor 435 (and threaded rod 437) which may open/close the positionable cover 260. The switches 440a-b may assess if the positionable cover is closed or open respectively. The switches 450a-b may assess if the second elongated members are down or up respectively. Electrical switch 460 may electrically couple switches 440 and 450 to one or more remote trigger mechanisms 465 which operate the loose feed dispensing system and the hay bale transport system.

Figure 8:
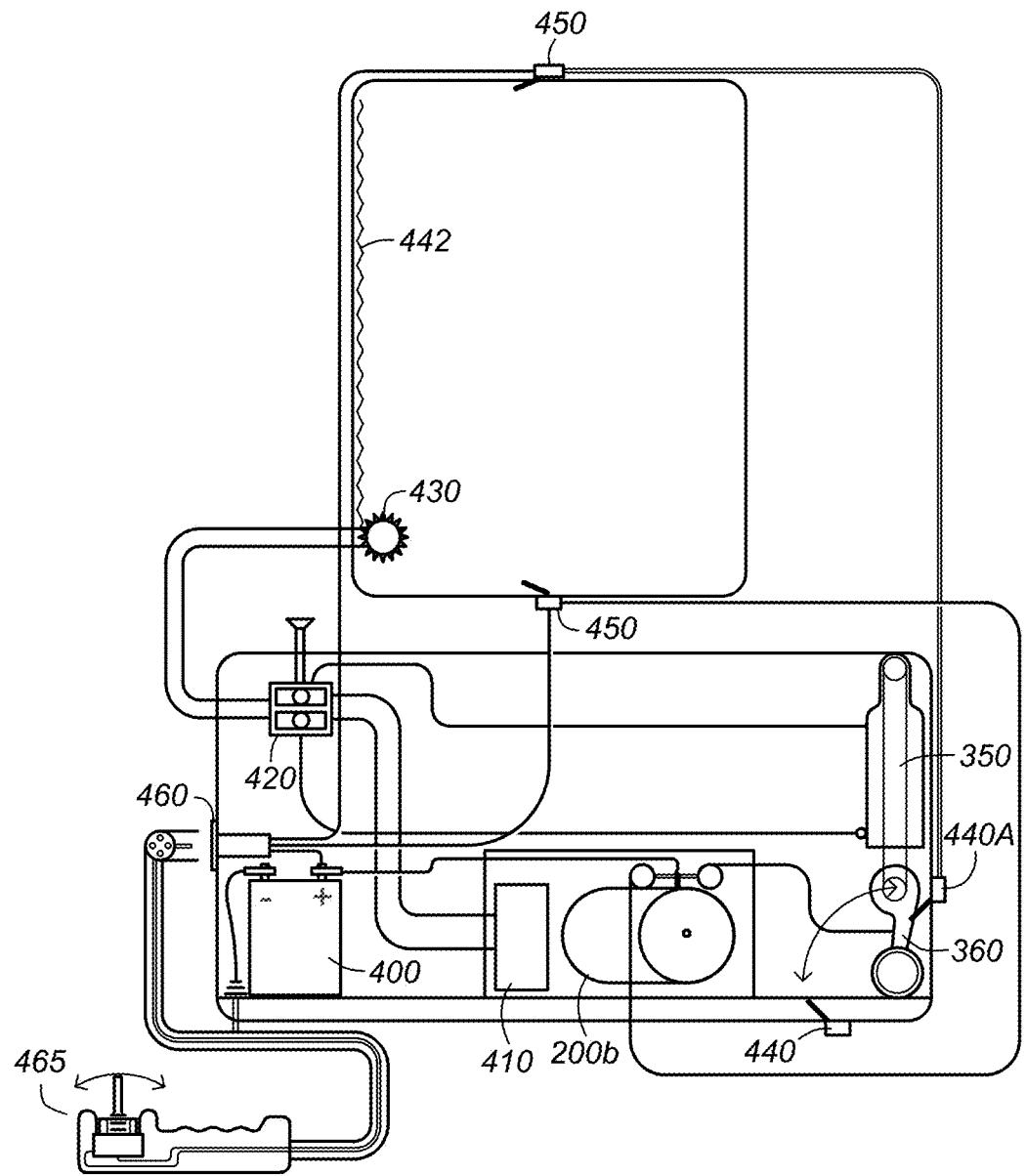
FIG. 8 depicts an electrical diagram of the remote trigger system coupled to a loose feed dispensing system and a hay bale transport system.

FIG. 8 depicts an electrical diagram of the remote trigger system coupled to a loose feed dispensing system and a hay bale transport system. Motor 200B is coupled to battery 400 and pump 410. Pump 410 is coupled to switch 420. Pump 410 may be connected directly to the hydraulic cylinders. Switch 420 directs hydraulic fluids to hydraulic cylinder 350 or to work a motor 430 (which drives a chain drive 442) which may open/close the positionable cover 260. The switches 440a-b may assess if the positionable cover is closed or open respectively. The switches 450a-b may assess if the second elongated members are down or up respectively. Switches 440a and 450a may be three way terminal switches with a carrier hot wire. Electrical switch 460 may electrically couple switches 440 and 450 to one or more remote trigger mechanisms 465 which operate the loose feed dispensing system and the hay bale transport system.

Figure 9:
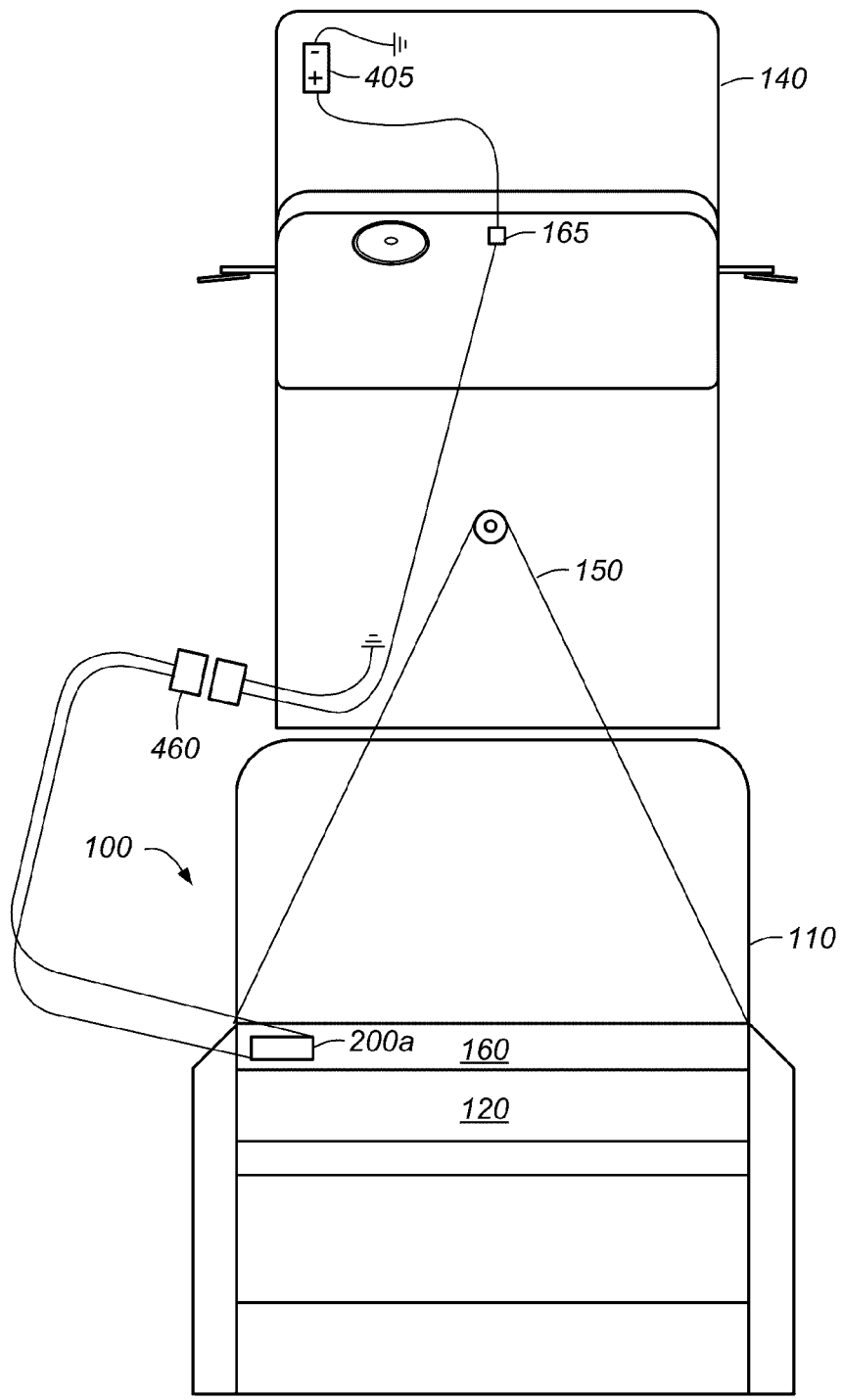
FIG. 9 depicts an electrical diagram of the remote trigger system in a towing vehicle coupled to a loose feed dispensing system and a hay bale transport system in a trailer.

FIG. 9 depicts an electrical diagram of the remote trigger system 165 in a towing vehicle 140 coupled to a loose feed dispensing system and a hay bale transport system in a trailer 110. The remote trigger system may include a manual or digital counter. The counter may assist an operator in determining how much feed has been dispensed. FIG. 9 depicts an electrical diagram of the remote trigger system 165 wherein the remote trigger is positioned in the towing vehicle 140 and hard wired to the feed dispensing system and a hay bale transport system. Typically the two systems are connected through a standard plug (e.g., two terminal #6 plug) used to connect trailers and towing vehicles. The remote trigger system may be electrically coupled to the towing vehicle's battery 405 for power.

Figure 10:
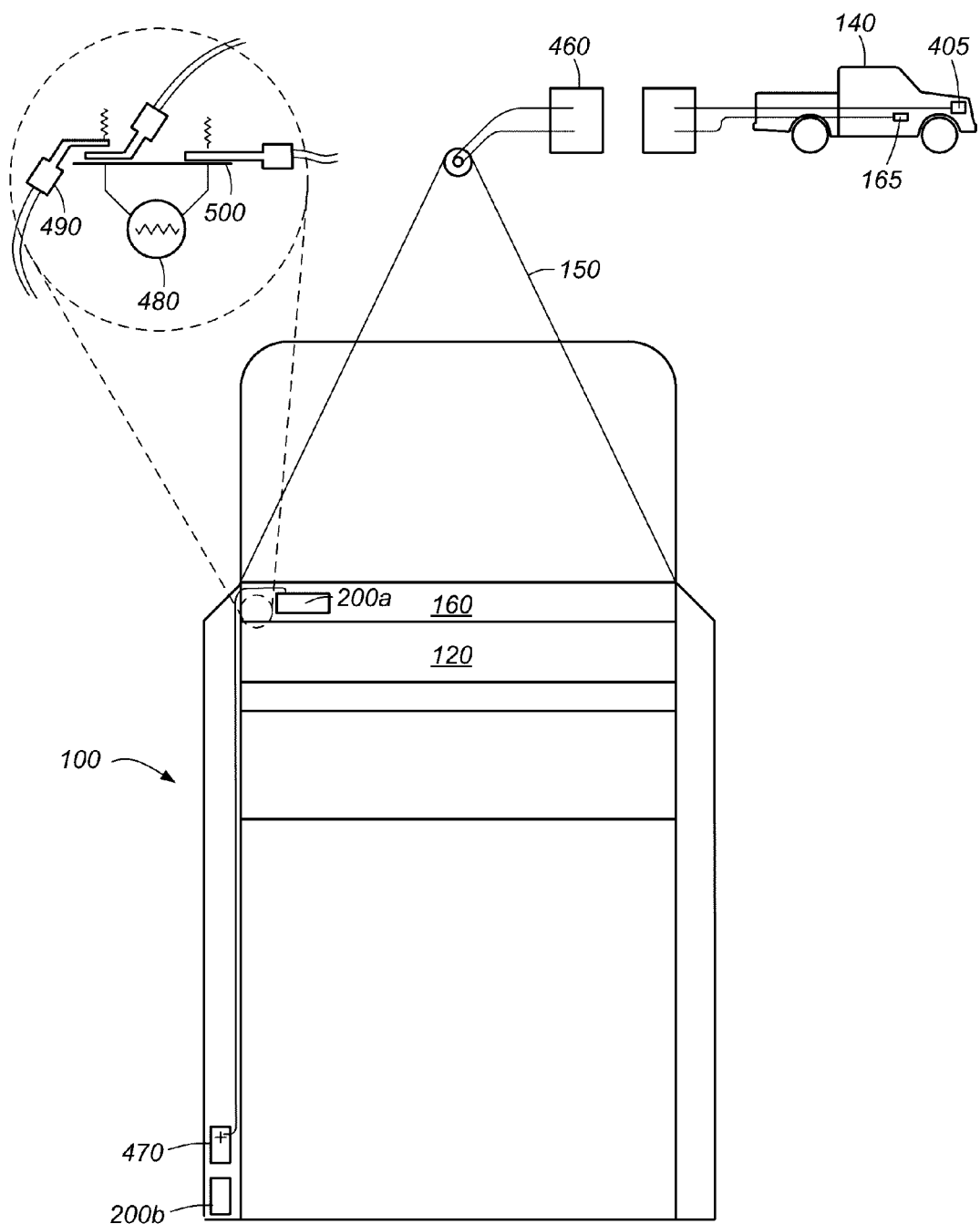
FIG. 10 depicts an electrical diagram of the remote trigger system in a towing vehicle coupled to a loose feed dispensing system and a hay bale transport system in a trailer.

FIG. 10 depicts an electrical diagram of the remote trigger system 165 in a towing vehicle 140 coupled to a loose feed dispensing system and a hay bale transport system in a trailer 110. The remote trigger system may include a manual or digital counter. The counter may assist an operator in determining how much feed has been dispensed. FIG. 10 depicts an electrical diagram of the remote trigger system 165 wherein the remote trigger is positioned in the towing vehicle 140 and wirelessly coupled, using a wireless switch 480, to the feed dispensing system and a hay bale transport system. Wireless switch 480 may be coupled 490 to a secondary battery 470 and coupled 500 to feeder motor 200a. Typically the two systems are connected through a standard plug (e.g., two terminal #6 plug) used to connect trailers and towing vehicles, in a wireless option the hard wired connection may be used to charge the secondary battery 470. The secondary battery may be necessary to power the pump and motors driving the feed and hay system if a wireless switch option is employed. The secondary battery must be charged using any one of various means for the wireless trigger system to work. The remote trigger system 165 may be electrically coupled to the towing vehicle's battery 405 for power.

In some embodiments, a method may include extracting residual animal feed portions. The method may include conveying animal feed through an opening in a cover which covers at least a portion of a trailer. The method may include conveying the animal feed across a transport ramp which couples the opening to a first container. The transport ramp may include a plurality of openings. The method may include allowing feed of a predetermined size and larger to be conveyed from the opening to the first container using the transport ramp. The method may include allowing feed of a predetermined size and smaller to be conveyed through the plurality of openings in the transport ramp from the opening to a second container.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A trailer feeder system, comprising:
    a trailer which transports, during use, animals, wherein the trailer couples, during use, to a vehicle, and wherein the trailer comprises:
        a first container which contains, during use, animal feed, wherein the first container comprises a dispensing mechanism for dispensing, during use, feed in the first container to a surface adjacent the trailer;
        a transport ramp which connects the first container to an opening in a cover which covers at least a portion of the trailer, wherein the transport ramp comprises a plurality of openings;
        a second container which contains, during use, animal feed;
        wherein the plurality of openings are sized to allow feed of a predetermined size and larger to be conveyed from the opening in the cover to the first container, and wherein the plurality of openings are sized to allow feed of a predetermined size and smaller to be conveyed from the opening in the cover to the second container.

2. The system of claim 1, further comprising a first remote trigger mechanism which activates, during use, the dispensing mechanism of the first container.

3. The system of claim 1, further comprising a positionable cover to inhibit, during use, entry in the opening in the cover.

4. The system of claim 1, wherein the second container decouples, during use, from the trailer such that transportation of any feed contained within is facilitated.

5. The system of claim 1, wherein the transport ramp conveys feed from the opening in the cover to the first container via gravity.

6. The system of claim 1, wherein the transport ramp conveys feed from the opening in the cover to the first container via a conveyor belt.

7. The system of claim 1, wherein the trailer further comprises a transport mechanism configured to elevate a bale of hay off of a surface.

8. The system of claim 7, wherein the transport mechanism is positioned at a second end of the trailer opposite of a first end, and wherein the first end comprises a coupling mechanism configured to couple the trailer to a vehicle.

9. The system of claim 7, wherein the transport mechanism comprises at least one elongated member, and wherein at least one of the at least one elongated members is configured to penetrate a bale of hay.

10. The system of claim 7, further comprising a second remote trigger mechanism which activates, during use, the transport mechanism such that a bale of hay is elevated off or lowered onto the surface.

\* \* \* \* \*